United States Patent [19]

Downs et al.

[11] Patent Number: 5,894,321
[45] Date of Patent: Apr. 13, 1999

[54] MEDIA OBJECT DESCRIPTION FOR SELF CONFIGURING CONFERENCES

[75] Inventors: Terry Downs, Forest Grove; Andrew J. Kuzma, Portland, both of Oreg.

[73] Assignee: Intel Corporation, Santa Clara, Calif.

[21] Appl. No.: 08/491,479

[22] Filed: Jun. 16, 1995

[51] Int. Cl.$^6$ ............................................. H04N 7/15
[52] U.S. Cl. ........................ 348/15; 370/260; 379/93.21
[58] Field of Search .............................. 348/15, 16, 17, 348/18, 19, 14; 379/202, 204, 205, 96, 94, 93, 93.21, 93.08, 93.14; 370/260, 261, 262, 263, 264, 265

[56] References Cited

U.S. PATENT DOCUMENTS

| | | | |
|---|---|---|---|
| 5,384,771 | 1/1995 | Isidoro et al. | 379/202 |
| 5,408,526 | 4/1995 | McFarland et al. | 379/202 |
| 5,502,727 | 3/1996 | Catanzaro et al. | 379/93 |
| 5,570,363 | 10/1996 | Holm | 379/202 |
| 5,590,127 | 12/1996 | Bales et al. | 379/202 |
| 5,623,490 | 4/1997 | Richter et al. | 370/263 |

*Primary Examiner*—Stella Woo
*Attorney, Agent, or Firm*—William H. Murray, Esq.; N. Stephan Kinsella, Esq

[57] ABSTRACT

A method and conferencing system for communicating data between a plurality of nodes of the conferencing system. According to a preferred embodiment, data is formatted into a conferencing object. The formatted data is transmitted from a source node via a communications means of the conferencing system to at least one receiving node. The conferencing object comprises a content portion having at least one data element, and a descriptor portion having effectiveness information, wherein the effectiveness information describes the value of the at least one data element of the content portion.

24 Claims, 3 Drawing Sheets

MEDIA OBJECT DESCRIPTION FOR SELF CONFIGURING CONFERENCES

BACKGROUND OF THE INVENTION

1. Field of the Invention

The present invention relates to conferencing systems and methods and, in particular, to computer-implemented processes and apparatuses for providing communication of data between nodes of a conferencing system.

2. Description of the Related Art

In a conferencing system, data is transferred between endpoints of the conferencing system. A point to point conferencing system comprises two endpoints such as personal computer (PC) systems, and multi-point conference systems comprise a plurality of endpoints and, typically, one or more multi-point conferencing units (MCUs). MCUs are also sometimes referred to as multi-point control units. Conferencing systems typically comprise a variety of conferencing elements, in addition to PCs and MCUs, such as routers and servers. Each endpoint has a processing bandwidth of a given magnitude or power, which may vary dynamically with time depending upon the processing load on the endpoint. The processing bandwidth of a particular endpoint also depends on the strength or processing ability of its microprocessor and other components.

Each endpoint is also able to receive and transmit data to various other elements of the conferencing system over a communications medium having a particular bandwidth. This communications bandwidth may also vary dynamically over time depending upon traffic on the respective communications media. Additionally, different elements within a conferencing system may be connected locally to transmission media of different types, having different communications bandwidths.

Data streams that are transferred to and from endpoints across communications media includes video data, audio data, and other data types. Various elements within a conferencing system, such as PC-based endpoints, MCUs, routers, and servers, serve as conference nodes for the conferencing system.

Thus, the endpoints and other nodes of conferencing systems have different processing and transmission bandwidths at any given point in time. For example, one endpoint's processor may at a given time be processing data and thus may be relatively heavily loaded. When the endpoint is heavily loaded, thus leaving a relatively low processing bandwidth remaining for processing of other data, it may not be able to adequately decode and process video, audio, and other data that it receives from another endpoint.

As another example, one endpoint may transmit high quality (i.e., high bandwidth) data over a transmission medium to an MCU, which is connected to several endpoints. One of these endpoints may have a weaker processor, may be heavily loaded, or may be connected to the MCU via a relatively low bandwidth communications medium. If the MCU transmits the high-quality data to all its endpoints, the weaker endpoint will not be able to receive or process the data adequately.

To address this problem, the quality of the data generated by a source endpoint may be lowered so that the slowest or "lowest common denominator" endpoint is able to process the data, but this lowers the quality for all receiving endpoints. Further, as the processing bandwidth of various endpoints dynamically changes in accordance with their respective processing loads, endpoints transmitting data into the conferencing system would need to continually monitor the processing bandwidths of other endpoints, and change the quality of the encoded data so transmitted in accordance therewith.

Similarly, the communications bandwidth associated with various endpoints of a conferencing system may vary from endpoint to endpoint. As described above, the quality of data originating from a source endpoint may have to be lowered in accordance with the potential receiving endpoint having the narrowest communications bandwidth. Such a technique lowers the quality of data delivered to other endpoints having a wide enough communications bandwidth to receive higher quality data, and may also require continual monitoring, for example by an MCU, of dynamically changing communications bandwidths of various endpoints.

Another problem faced in the prior art arises when endpoints having limited processing and communications resources have to select among several tasks which compete for the endpoint's resources. A receiving endpoint may be able to process one full quality data stream from a first endpoint or from a second endpoint, but not both high quality data streams from both first and second endpoints. One technique that may be used to address this problem involves reducing the quality of each data stream so that both may be processed and communicated with the receiving endpoint's limited resources. In certain contexts, however, it would be preferable to select, receive, and process only one of the competing data streams, rather than to receive both data streams at diminished quality. Various factors concerning the content of the data, its origin, quality, or other significance may need to be considered to select among competing data streams, but unfortunately the data streams must be received and analyzed before deciding whether to receive both data streams.

What is needed, therefore, is an apparatus, system, and method for allowing various conference elements to make more globally optimal conference configuring decisions regarding the transmission and receipt of conference data.

SUMMARY

There is provided herein a method and conferencing system for communicating data between a plurality of nodes of the conferencing system. According to a preferred embodiment of the invention, data is formatted into a conferencing object. The formatted data is transmitted from a source node via a communications means of the conferencing system to at least one receiving node. The conferencing object comprises a content portion having at least one data element, and a descriptor portion having effectiveness information, wherein the effectiveness information describes the value of the at least one data element of the content portion.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

Video Conferencing System Hardware

Figure 1:
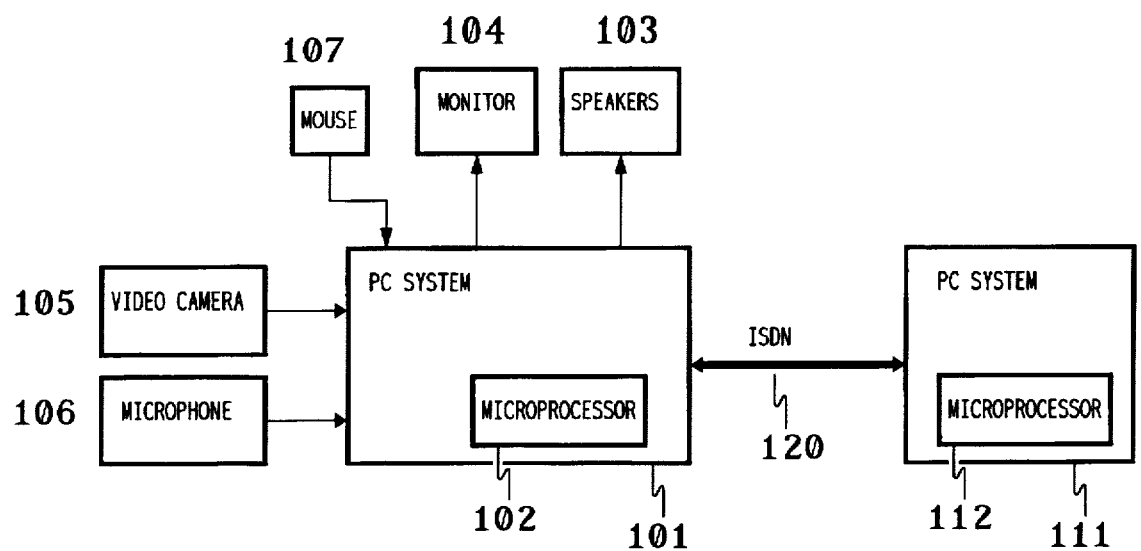
FIG. 1 is a block diagram of a preferred point-to-point video conferencing system in accordance with the present invention.

Referring now to FIG. 1, there is shown a block diagram of a preferred point-to-point video conferencing system 100 in accordance with the present invention. Video conferencing system 100 is a point-to-point conferencing system comprising two endpoints 101 and 111 connected by a communications channel, Integrated Services Digital Network (ISDN) 120. As will be understood, each endpoint is a PC system comprising a microprocessor. As illustrated, endpoint 101 comprises microprocessor 102, and endpoint 111 comprises microprocessor 112. Endpoints 101 and 111 need not be identically-configured PC systems. Processors 102 and 112, which need not be identical, may be general-purpose processors suitable for processing of conferencing data signals, such as the Intel® i386™, i486™, or Pentium™ processors. Those skilled in the art will appreciate that either of processors 102 and 112 may also be a special-purpose video processor such as the Intel® 82750PB.

Each of endpoints 101 and 111 display video data via video monitors such as video monitor 104, and play audio information through speakers such as speakers 103. Endpoints 101 and 111 may also receive video and audio information representing a local environment from video cameras and microphones such as video camera 105 and microphone 106. Further information from a user of either endpoint 101 or 111 may be input into the respective endpoint via a user input peripheral such as mouse 107, or other device suitable for receiving input from a user, for example, a keyboard or joystick (not shown).

In typical video conferencing usage, video, audio, and other data signals are encoded by the microprocessor of each endpoint, typically representative of the face and voice of the user of the respective endpoint, and transmitted via ISDN 120 to the other endpoint, where the signals are decoded and displayed on a monitor and the related audio signal played on a speaker. Thus, a user of endpoint 101 may see and hear the user of endpoint 111, and vice-versa, despite the users and their respective endpoints being separated by a vast distance.

Figure 3:
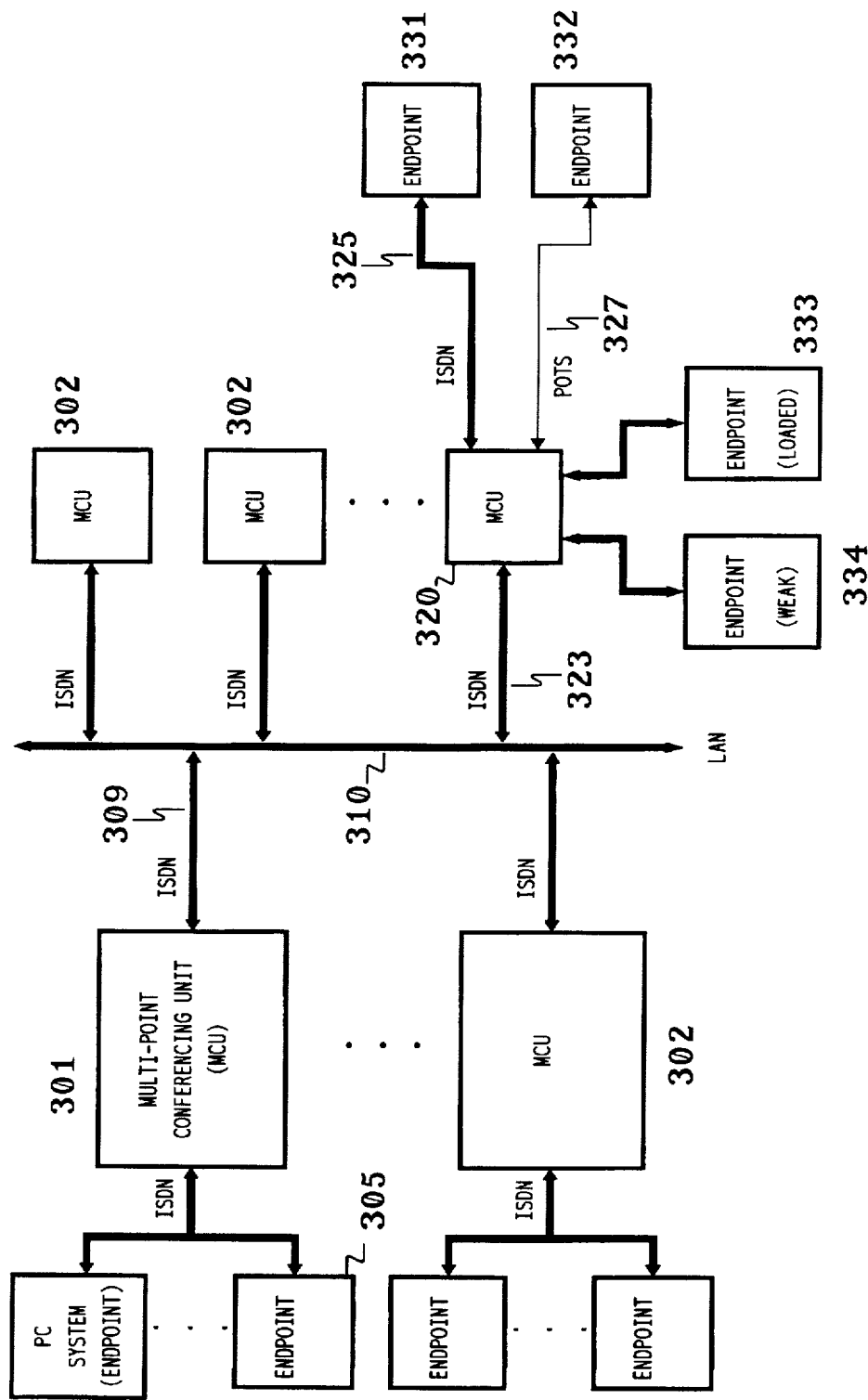
FIG. 3 is a block diagram of a preferred multi-point video conferencing system in accordance with the present invention.

Referring now to FIG. 3, there is shown a block diagram of a preferred multi-point video conferencing system 300 in accordance with the present invention. A multi-point conferencing system comprises a plurality of endpoints and other elements or nodes, which may be utilized as described above to encode and transmit data to, and receive and decode data from, other endpoints.

Multi-point video conferencing system 300 comprises a plurality of MCUs such as MCU 301, MCUs 302, and MCU 320. Each MCU may be connected via an ISDN link to other MCUs of the system through a local area network (LAN) such as LAN 310. As will be understood by those skilled in the art, various other communications media may also be utilized to interconnect MCUs or other nodes of conferencing system 300. Each MCU connects a plurality of conferencing nodes such as endpoints, in what is sometimes referred to as a star topology. As will be understood, MCUs provide facilities for connecting multiple user endpoints, and for a variety of conference services, such as:

Conference reservation and administration;
Conference management and control;
Audio mixing;
Video switching; and
Data distribution.

MCUs also route conference data to the appropriate endpoints, providing flow control as necessary. As will be understood, a single MCU can service more than one conference at a time. Each MCU is preferably a PC-based MCU, such as a video server, having multiple ports for supporting multiple endpoints, where the MCU is suitable for connecting endpoints to a video conferencing network and providing the above-mentioned services and facilities. Each endpoint is preferably a PC-based endpoint configured similarly to endpoints 101 and 111 of FIG. 1. Those skilled in the art will appreciate that some endpoints of system 300 may be connected directly to a communications medium such as LAN 310 without going through an MCU, and that conferencing system 300 may also comprise other nodes or elements such as routers or servers.

In use, an endpoint such as endpoint 305 of MCU 301 may generate data for transmission to other endpoints or nodes of system 300, such as endpoints 331–334 of MCU 320. Thus, endpoint 305 generates, encodes, and transmits data via an ISDN link to its own MCU 301, which transmits the data through ISDN links and LAN 310 to MCU 320. MCU 320 then distributes this data to its endpoints 331–334, where the data may be decoded and displayed, stored, or otherwise processed.

As illustrated in FIG. 3, various nodes such as endpoints 331–334 of system 300 may be permanently or temporarily associated with varying processing or communications bandwidths. For example, endpoint 332 is connected via a plain-old telephone system (POTS) line 327 to MCU 320. POTS lines are also sometimes referred to as PSTN (public switched telephone network) lines. As will be understood, POTS line 327 has a narrower communications bandwidth than other links such as ISDN link 325 which connects endpoint 331 to MCU 320. Thus, data cannot be transmitted at as high a data rate (i.e., at as high a quality) to endpoint 332 by MCU 320 as to endpoint 325. Additionally, some endpoints such as endpoints 333 and 334 have a lower processing bandwidth than other endpoints such as endpoint 331. In the exemplary system 300 of FIG. 3, endpoint 334 has a weaker processor than other endpoints, while endpoint 333 is relatively heavily loaded at the current time. Thus, endpoints 333 and 334 have relatively narrower processing bandwidth than other endpoints.

Media Objects and Descriptors

Basic definitions and discussion of objects may be found in chapter 1 of Peter Coad & Jill Nicola, *Object Oriented Programming* (Prentice Hall, 1993), chapter 1 of which is incorporated herein by reference. In the present invention, an object are collections of data having a descriptor portion and a content portion. Content may be static, or may be a stream of data having temporal properties.

In a conferencing system there is a conference object associated with the conference. The conference object has a descriptor and a set of data streams as the content of the object. Each data stream may itself be a sub-object with its own descriptor and content portions, which comprises a set of data lumps. Each data lump can further be treated as an object with descriptor and content portions.

In current conferencing systems, the various forms of media stream are treated separately. For example, video is regarded as distinct from audio. From a conferencing perspective, this viewpoint detracts from the goal of global optimization of the conference.

In the present invention, various forms of media object are treated as a single unified object class, and, instead of separating the media types, the unified object class is parameterized more generically. In the present invention, therefore, objects are self-describing objects that provide a similar way of handling all data types. Thus, conference nodes such as endpoints and MCUs are able to participate in the conference in a more unified manner, which thus allows global optimization of the conference to be more easily and more closely approximated than if the media objects were treated separately. The present invention thus provides a means by which nodes of a conferencing system may self-configure at appropriate points in order to optimize their behavior.

The present invention provides a means for packaging media objects in order to implement conferences which are able to configure themselves in an optimal manner and make other modifications to their behavior in response to environmental changes. Accordingly, source endpoints of conferencing systems in accordance with the present invention configure conference data in accordance with a media object description, as described in more detail below.

Figure 2A:
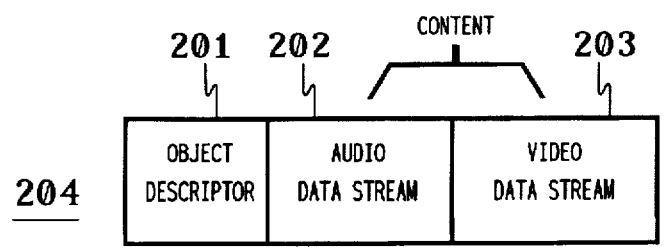
FIGS. 2A–D are diagrams of a video conferencing object and associated descriptors, sets of data streams, and data lumps in accordance with the present invention.

Referring now to FIGS. 2A–D, there are shown diagrams of a video conferencing object 204 and associated descriptors, sets of data streams, and data lumps in accordance with the present invention. As shown in FIG. 2A, conferencing object 204 contains an object descriptor 201 and content portions 202 and 203. In the illustrated example, object 204 contains an audio data stream 202 and video data stream 203. As will be understood, conferencing object 204 may contain other content portions (not shown) that represent data other than video or audio data, e.g. mouse positioning or movement data. In general, a conferencing object may contain various types of content portions, depending upon the description supplied in object descriptor 201.

Figure 2B:
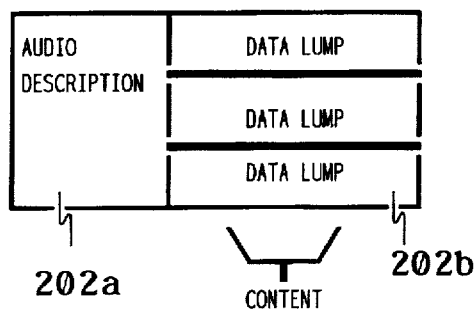
Figure 2C:
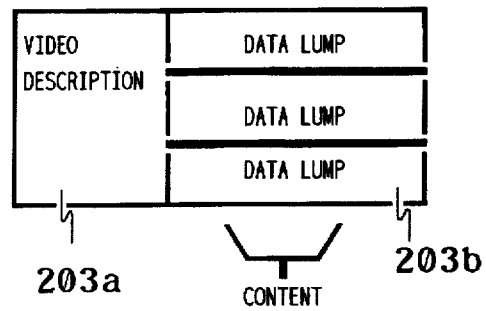
Figure 2D:
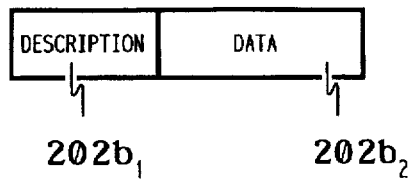

As shown in FIGS. 2B and 2C, audio data stream 202 and video data stream 203 are objects in themselves. Thus, audio data stream 202 comprises an audio description 202a, which describes the contents portion comprising a number of data lumps 202b. Video data stream 203 is similarly configured as an object. Referring now to FIG. 2D, there is shown in more detail a data lump 202b of audio object 202. Data lump 202b is also an object, characterized by its own descriptor and content portions $202b_1$ and $202b_2$.

Point-to-Point Example

These objects are configured such that nodes of system 300 are able to intelligently configure themselves based on current environmental considerations such as available processing or communications bandwidth. Such objects may also be utilized in point-to-point conferencing systems.

For example, referring once more to point-to-point conferencing system 100 of FIG. 1, consider a situation where endpoint 101 is a source endpoint transmitting a conferencing object to receiving endpoint 111, where the conferencing object consists of a single video stream and a single audio stream as illustrated by conferencing object 204 of FIG. 2A. The data therein is transmitted on a frame-by-frame basis, and each frame object within the stream is hierarchical in nature, in accordance with the present invention. As will be understood, a frame object in this context serves as a container for holding video data. In particular, in the frame object descriptor there is included basic structural information about the structure of the frame data, such as the position and size of each of the elements of the hierarchical data. In addition, the descriptor includes "effectiveness information" which describes the value of each of the elements of the hierarchy. Thus, if the frame consists of three hierarchically-related elements, the descriptor might provide information which describes the elements of the content portion as follows:

Element 1 provides 50% of the quality
Adding Element 2 provides 95% of the quality
Adding Element 3 provides 100% of the quality As will be understood, the transmission and processing of element 1 alone requires less bandwidth than processing element 1 plus element 2, and so on. As will be appreciated, conference object descriptor 201 may also describe the amount of data or cost associated with various hierarchical elements of the content portion, or the amount of processing and communications bandwidth required to process or transmit the element, so that an endpoint or other node will know how much bandwidth each element or element combination will cost.

Including this information in the object descriptor 201 allows conference nodes to make intelligent choices about how to handle the data content of the object in the optimal way. For example, in a point-to-point conferencing system such as system 100 of FIG. 1, source endpoint 101 can transmit the object configured in this way to receiving endpoint 111. Normally, endpoint 111 has enough processing bandwidth to decode the data utilizing all three elements, thus providing the highest quality reproduction available. However, at particular times endpoint 111 may have a heavy processing load due to other processing being performed by microprocessor 112, thus reducing the processing bandwidth available for decoding conferencing objects.

Thus, endpoint 111 may only have enough processing bandwidth to process element 1 of the object. In the prior art, endpoint 111 might have to skip the decoding of the conference object since it simply did not have enough processing bandwidth to spare. Alternatively, endpoint 111 might suspend current processing in order to process the entire conferencing object; however, this decision may be unwise because the abandoned processing may be of more importance than decoding the conferencing object at 100% quality.

However, in the present invention endpoint 111 will know from object descriptor 201 that its options are greater—i.e., that it can choose to process element 1; elements 1 and 2; or elements 1–3. Endpoint 111 will have the option to use its available processing bandwidth to at least decode element 1 and provide a 50% quality result. Further, endpoint 111 will also know how much quality will result from these various options, and thus can make a more informed decision about how to allocate its available processing bandwidth. For example, endpoint 111 may choose to decrease its processing bandwidth dedicated to other uses just enough to allow endpoint 111 to decode elements 1 and 2 of the conference object so as to provide 70% quality results. Without the information and options provided by conferencing object 204, endpoint 111 would not be able to exercise such options or make as informed decisions.

Multi-Point Example

Consider now the same example with respect to multi-point video conferencing system 300 of FIG. 3. As will be understood, a source endpoint such as endpoint 305 may generate a conference object such as described immediately above, which is then transmitted to other MCUs such as MCU 320 for further transmission to selected endpoints connected thereto. In this illustrative example, endpoint 305 transmits conference object 204 to MCU 320 for further transmission to each of endpoints 331–334.

Exemplary endpoint 331 has enough processing and communications bandwidth to process a conference object at the highest possible quality. Each of endpoints 332–334 illustrates a potential processing or communications bandwidth limitation that may be more efficiently addressed by nodes of conferencing system 300. As described hereinabove, endpoint 332 is connected via a POTS line 327 to MCU 320, where POTS line 327 has a narrower communications bandwidth than other links such as ISDN link 325 which connects endpoint 331 to MCU 320. Because of this communications bandwidth limitation, endpoint 332 cannot receive data at a high enough rate to allow it to receive all the data contained at the highest level of quality of conferencing object 204. Endpoints 333 and 334 have a lower or narrower processing bandwidth than an endpoint such as endpoint 331, since endpoint 334 has a weaker processor than other endpoints, and endpoint 333 is heavily loaded at the current time.

When MCU 320 receives conferencing object 204, because conferencing object 204 contains object descriptor 201, MCU 320 is aware of the way the data is organized and what it represents in terms of effectiveness, quality, and other parameters, without having to process and examine the data in the first place. Instead of having to process the data first and then transmit the data at a lower quality for all four endpoints 331-334 so that the data rate of POTS line 327 may be matched, as in the prior art, MCU 320 can simply send along the entire conferencing object to endpoints 331, 333, and 334, since their transmission bandwidths are wide enough for such a data transmission.

MCU 320 is configured so that it is aware of the characteristics of endpoint 332, such as communications bandwidths, including the limitations of POTS line 327. Assume that POTS line 327 is only able to transmit data at a rate sufficient to transmit the data corresponding to element 1, but not the additional information of elements 2 and 3. In this case, MCU 320 can filter out data related to elements 2 and 3, without having to analyze the data, and transmit only element 1-related data to endpoint 332 via POTS line 327. Thus, endpoint 332 will be able to decode the data with 50% quality results, while MCU 320 can transmit the entire conferencing object 204 comprising all three elements to the other endpoints connected thereto.

Endpoints 333 and 334 are able to receive the entire conferencing object via their communications lines, but have processing bandwidth limitations. Endpoint 334 contains a processor too weak to decode data to provide 100% quality results. Assuming that endpoint 334 is able, however, to decode both element 1 and element 2, it can decode these elements with available processing bandwidth to provide 95% quality results. (Alternatively, because the processing bandwidth limitations of endpoint 334 are due to a permanent physical condition of endpoint 334, which may be known to MCU 320, MCU 320 may filter out element 3 before transmitting conferencing object 204 to endpoint 334 in the first place to free up transmission bandwidth.)

Endpoint 333 has only a temporary processing bandwidth limitation, so MCU 320 can transmit conferencing object 204 without first filtering out any data elements. Endpoint 333, because of object descriptor 201, knows that it can devote different amounts of processing bandwidth to decoding data from the object, to result in different quality results. Given this information, endpoint 333 can more intelligently decide how much processing bandwidth to allocate to processing conferencing object 204. For example, suppose that endpoint 333 is loaded with other processing tasks such that it is able to process element 1 alone, thus yielding 50% quality results. Alternatively, it is able to delay or slow down its other processing slightly and also process elements 1 and 2, thus yielding 95% quality. However, because of other processing tasks and priorities, endpoint 333 cannot provide enough bandwidth to process elements 1, 2, and 3. Thus, endpoint 333 may decide whether to process element 1 only at 50% quality, or sacrifice some other processing to process both elements 1 and 2 to provide 95% quality. Because object descriptor 201 provides this information, endpoint 333 may more intelligently decide whether it is worthwhile to sacrifice a certain amount of other processing tasks to increase quality from 50% to 95%. Furthermore, even where an endpoint does not have an option to shift bandwidth from other processing to conferencing object processing, having the conferencing object hierarchically configured allows the endpoint to at least devote available processing bandwidth to produce some usable result.

As another example, consider a conferencing object containing data representative of the movements of a mouse pointer. For instance, the movements of a mouse connected to endpoint 305 generate positions which a mouse pointer occupies at given instants of time on an X,Y grid associated with displays on a monitor. In some usages it may be desirable to transmit these mouse coordinates or positions to other endpoints in the conference, such as endpoints 331-334 of FIG. 3, so that the mouse pointer may be displayed and shown moving on the monitor of these receiving endpoints. However, because of the aforementioned bandwidth limitations, it may be impossible, or expensive, for each endpoint to receive or process all of the conferencing information available. Endpoint 331 may be able to receive and process mouse movement information corresponding to a fine granularity—i.e., updating the mouse position at every frame interval. Other endpoints may only be able to process mouse movement information at a coarser granularity, due to processing or communications bandwidth limitations.

Thus, in accordance with the present invention, the media object is configured to supply hierarchical streams of mouse position data at different granularity levels, along with an object descriptor describing this hierarchy. Thus, if the object content consists of two levels of mouse-movement granularity, the descriptor might provide information which describes the elements of the content portion as follows:

Element 1 mouse position updated every 10 frames

Adding Element 2 mouse position updated every frame

As will be understood, the transmission and processing of element 1 alone requires much less bandwidth than processing element 1 and element 2. It will be understood that the mouse data stream may be incorporated into the previously described conferencing object 204. In this case, conference object descriptor 201 contains a description of audio and video data streams 202 and 203, as well as a description of the mouse position data stream (not shown).

As in the previous example, MCU 320 will know the form of mouse data in the object and the granularity associated with it and will be able to filter out some information for endpoint 332, to provide a lower bandwidth object to transmit that nevertheless still contains usable data.

It will be understood that, in general, the present invention provides descriptors sufficiently rich to characterize the data streams they describe, which are arranged in a hierarchical manner as described hereinabove. Thus, other elements in the descriptor may include priority level, time reference, and time importance (e.g., how long after its associated time it becomes worthless). With a priority level or time importance associated with information, for example, a conferencing node may intelligently decide how to configure itself for processing or transmitting the data. For instance, if given data is of a relatively low priority, or is of low time importance because it is becoming old and thus stale, an endpoint such as endpoint 333 can decide that it will continue processing its current load and ignore the low priority data. Alternatively, endpoint 333 can decide to decode the low priority data at the lower quality levels to save more processing bandwidth for potentially higher priority processing applications.

Thus, in general, the current invention associates rich descriptors with conferencing objects, and provides for a unification of conferencing objects and the use of rich descriptors to characterize these objects in a uniform way. Effectiveness data (e.g., quality, display resolution, priority, granularity, time importance) is included in the object descriptors with hierarchical data streams to allow conference nodes to make better use of the hierarchy. Such use of the unified object description to make decisions at conference nodes allows a closer approximation of the global optimum for the conference.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for communicating data between a plurality of nodes of a data system engaged in a data conference, the method comprising the steps of:

(a) formatting data into a data object; and
   (b) transmitting the data object from a source node via a communications means of the data system to at least one receiving node, wherein:
      the data object comprises a content portion having a plurality of hierarchically arranged data elements; and
      the data object comprises a descriptor portion having hierarchy information which describes the hierarchical arrangement of the data elements of the content portion and having at least one effectiveness parameter for describing the value of the hierarchically arranged data elements of the content portion, the at least one effectiveness parameter comprising at least one of quality, display resolution, granularity, cost of processing, cost of transmission, and time importance parameters;
   (c) receiving the formatted data with the receiving node; and
   (d) deciding with the receiving node, based on said at least one effectiveness parameter which of the hierarchically arranged data elements to receive and process so as to arrange the data conference more optimally.

2. The method of claim 1, wherein the plurality of nodes comprises at least two endpoints configured in a point to point conferencing system.

3. The method of claim 1, wherein the content portion comprises a video stream and an audio stream.

4. The method of claim 3, wherein the video stream and audio stream are subobjects comprising a content portion and a descriptor portion.

5. The method of claim 1, wherein:

the plurality of nodes comprises a plurality of endpoints configured in a multipoint conferencing system;
   the communications means is a communications network; and
   the plurality of endpoints is interconnected by the communications network.

6. The method of claim 5, wherein the plurality of nodes further comprises a plurality of multipoint conferencing units, routers, and servers.

7. The method of claim 5, wherein:

each endpoint is a personal computer based system; and
   each endpoint is associated at any given time with a processing bandwidth and a communications bandwidth.

8. The method of claim 1, wherein the descriptor portion further comprises cost information which describes the cost of the data elements of the content portion.

9. The method of claim 8, wherein the cost information describes the cost of the data elements of the content portion in terms of the amount of data in each data element.

10. The method of claim 8, wherein the cost information describes the cost of the data elements of the content portion in terms of the processing and communications bandwidth needed to process and transmit each data element.

11. The method of claim 1, wherein the data elements comprise a plurality of data elements of differing levels of quality.

12. The method of claim 1, wherein the data elements comprise a plurality of data elements requiring differing amounts of processing and communications bandwidth.

13. A data system, comprising:

(a) a plurality of nodes engaged in a data conference;
   (b) communications means connected to the plurality of nodes;
   (c) means for formatting data into a data object;
   (d) a source node for transmitting the data object from the source node via the communications means to at least one receiving node, wherein:
      the data object comprises a content portion having a plurality of hierarchically arranged data elements; and
      the data object comprises a descriptor portion having hierarchy information which describes the hierarchical arrangement of the data elements of the content portion and having at least one effectiveness parameter for describing the value of the hierarchically arranged data elements of the content portion, the at least one effectiveness parameter comprising at least one of quality, display resolution, granularity, cost of processing, cost of transmission, and time importance parameters;
   (e) the receiving node for receiving the formatted data, wherein the receiving node comprises means for deciding, based on said at least one effectiveness parameter, which of the hierarchically arranged data elements to receive and process so as to arrange the data conference more optimally.

14. The data system of claim 13, wherein the plurality of nodes comprises at least two endpoints, wherein the data system is configured as a point to point conferencing system.

15. The data system of claim 13, wherein the content portion comprises a video stream and an audio stream.

16. The data system of claim 15, wherein the video stream and audio stream are subobjects comprising a content portion and a descriptor portion.

17. The data system of claim 13, wherein:

the plurality of nodes comprises a plurality of endpoints, wherein the data system is configured as a multipoint conferencing system;
   the communications means is a communications network; and
   the plurality of endpoints is interconnected by the communications network.

18. The data system of claim 17, wherein the plurality of nodes further comprises a plurality of multipoint conferencing units, routers, and servers.

19. The data system of claim 17, wherein:
   each endpoint is a personal computer based system; and
   each endpoint is associated at any given time with a processing bandwidth and a communications bandwidth.

20. The data system of claim 13, wherein the descriptor portion further comprises cost information which describes the cost of the data elements of the content portion.

21. The data system of claim 20, wherein the cost information describes the cost of the data elements of the content portion in terms of the amount of data in each data element.

22. The data system of claim 20, wherein the cost information describes the cost of the data elements of the content portion in terms of the processing and communications bandwidth needed to process and transmit each data element.

23. The data system of claim 13, wherein the data elements comprise a plurality of data elements of differing levels of quality.

24. The data system of claim 13, wherein the data elements comprise a plurality of data elements requiring differing amounts of processing and communications bandwidth.

* * * * *